US006107264A

United States Patent [19]

van der Helm et al.

[11] Patent Number: 6,107,264

[45] Date of Patent: *Aug. 22, 2000

[54] ENZYMATIC BLEACH COMPOSITION

[75] Inventors: Marcel van der Helm; Monique van der Heiden, both of Vlaardingen; Dirk Herman Hondmann, Rotterdam; Annelies Smits, Vlaardingen; Ton Swarthoff, Vlaardingen; Cornelis Theodorus Verrips, Vlaardingen, all of Netherlands

[73] Assignee: Lever Brothers Company, division of Conopco, Inc., New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/991,328

[22] Filed: Dec. 16, 1997

[30] Foreign Application Priority Data

Dec. 20, 1996 [EP] European Pat. Off. .............. 96203734

[51] Int. Cl.[7] .......................... C11D 3/386; C11D 3/395; D06L 3/00; C01B 13/00

[52] U.S. Cl. ......................... 510/320; 510/305; 510/392; 510/530; 8/111

[58] Field of Search .................................... 510/305, 300, 510/320, 321, 374, 392, 393, 530; 424/94.1, 111

[56] References Cited

U.S. PATENT DOCUMENTS

| | | | |
|---|---|---|---|
| 4,072,568 | 2/1978 | Masurekar et al. . | |
| 4,349,633 | 9/1982 | Worne et al. | 435/281 |
| 4,673,647 | 6/1987 | Brothers et al. | 435/189 |
| 5,397,705 | 3/1995 | Zukowski et al. | 435/222 |
| 5,431,842 | 7/1995 | Panandiker et al. | 435/188 |
| 5,527,487 | 6/1996 | Mikkelsen et al. | 510/393 |
| 5,558,812 | 9/1996 | Hahn et al. | 510/321 |
| 5,601,750 | 2/1997 | Domke et al. | 252/186.38 |
| 5,705,469 | 1/1998 | Blake et al. | 510/392 |
| 5,798,208 | 8/1998 | Crea | 435/6 |

FOREIGN PATENT DOCUMENTS

| | | |
|---|---|---|
| 0 086 139 | 8/1983 | European Pat. Off. . |

*Primary Examiner*—Joseph D. Anthony
*Attorney, Agent, or Firm*—Milton L. Honig

[57] ABSTRACT

There is provided an enzymatic bleach composition comprising one or more surfactants and an enzyme of extracellular origin, capable of oxidizing substrates by the build-in of one or more oxygen atoms into the substrate using molecular oxygen, in particular a dioxygenase from extracellular origin, and a process for bleaching stains present on fabrics comprising treating the stained fabrics with said composition.

8 Claims, No Drawings

ENZYMATIC BLEACH COMPOSITION

TECHNICAL FIELD

The present invention generally relates to an enzymatic bleach composition. More in particular, the invention relates to an enzymatic bleach composition for bleaching stains present on fabrics.

BACKGROUND AND PRIOR ART

Enzymatic bleach compositions comprising a hydrogen peroxide-generating system are well known in the art. For instance, GB-A-2 101 167 (Unilever) discloses an enzymatic hydrogen peroxide-generating system comprising a $C_1$–$C_4$ alkanol oxidase and a $C_1$–$C_4$ alkanol. Such enzymatic bleach compositions may be used in detergent compositions for fabric washing, in which they may effectively provide a low-temperature enzymatic bleach system. In the wash liquor, the alkanol oxidase enzyme catalyses the reaction between dissolved molecular oxygen and the alkanol to form an aldehyde and hydrogen peroxide.

In order to obtain a significant bleach effect at low wash temperatures, e.g. at 15–55° C., the hydrogen peroxide must be activated by means of a bleach activator. Today, the most commonly used bleach activator is tetra-acetyl ethylene diamine (TAED), which yields peracetic acid upon reacting with the hydrogen peroxide, the peracetic acid being the actual bleaching agent.

WO-A-89/09813 (Novo-Nordisk) discloses enzymatic bleaching compositions comprising a source of hydrogen peroxide and a peroxidase, and WO-A-91/05839 (Novo Nordisk) discloses enzymatic anti dye-transfer compositions comprising an (a) an enzyme exhibiting peroxidase activity and a source of hydrogen peroxide or (b) an enzyme exhibiting oxidase activity on phenolic compounds. The compositions are said to bleach any dissolved dye so that no dye can redeposit upon the fabric.

Peroxidases and laccases are well described in the art as enzymes which can be used to catalyse the oxidation reaction of a substrate with hydrogen peroxide or molecular oxygen, respectively. Other applications of these enzymes in oxidative processes include, amongst others, polymerization of lignin, in-situ depolymerization of lignin in Kraft pulp, bleaching of denim dyed garments, polymerization of phenolic substances in juices and beverages and hair bleaching (WO-A-92/18683, WO-A-95/07988, WO-A-95/01426).

It is known that laccases and (haem) peroxidases generally oxidize their substrates via electron transfer reactions, such as oxidation of hydroquinones to quinones or formation of radicals that may subsequently react further with other available molecules, in which oxygen and hydrogen peroxide act as the electron acceptor, respectively. These reactions may lead to bleaching of the substrate, but on the other hand, they may cause darkening of the substrate due to polymerization. The latter phenomenon is well known from browning reactions between polyphenolic substrates and laccases or polyphenol oxidases in nature.

A completely different way of oxidizing chromophores is by incorporation of one or more oxygen atoms; these reactions are performed by mono- and di-oxygenases using molecular oxygen. Many dioxygenases, such as the catechol dioxygenases and protocatechuate dioxygenase, have been described in the literature. In general, these enzymes are part of complex intracellular multi enzyme systems which may be bound to membranes.

EP-A-086 139 (Transgene) relates to the cloning and expression of the *xylE* gene from *Pseudomonas putida,* coding for such an intracellular dioxygenase called 2,3-catechol oxygenase by means of recombinant DNA techniques. The thus produced (intracellular) 2,3-catechol oxygenase may be applied in the food industry and in the cosmetic/pharmaceutic industry and, inter alia, the application of such dioxygenases for disinfecting surfaces is mentioned.

Although several enzymatic bleach systems have been proposed, there is still a need for alternative or improved enzymatic bleach systems. In particular, the enzymatic bleach system should be capable of bleaching broad spectrum of stains, using dissolved molecular oxygen from the air.

It is therefore an object of the present invention to provide alternative or improved enzymatic bleach systems which, in particular, should be capable of bleaching broad spectrum of stains, using dissolved molecular oxygen from the air. It is a further object of the present invention to provide an alternative or improved enzymatic bleach process.

We have now surprisingly found that enzymes from extracellular origin, capable of oxidizing substrates by the build-in of one or more oxygen atoms into the substrate using molecular oxygen, can effectively be used for the bleaching of chromophores present in stains on textile. Moreover, we have found that oxygenases secreted by microorganisms in the fermentation fluid are much more effective than the catechol dioxygenase described in the art. This appears to be due to a much broader substrate specificity and the ability to oxidize complex chromophores, in contrast to the described catechol dioxygenase which only works on simple substituted phenols.

Accordingly, the above and further objects of the invention are achieved by the enzymatic bleach composition of the invention which is characterized in that it comprises one or more surfactants and an enzyme of extracellular origin, capable of oxidizing substrates by the build-in of one or more oxygen atoms into the substrate using molecular oxygen.

DEFINITION OF THE INVENTION

According to a first aspect of the invention, there is provided an enzymatic bleach composition comprising one or more surfactants and an enzyme of extracellular origin, capable of oxidizing substrates by the build-in of one or more oxygen atoms into the substrate using molecular oxygen. Preferably, the composition comprises a fungal dioxygenase from extracellular origin.

According to a second aspect, there is provided a process for bleaching stains present on fabrics comprising treating stained fabrics with said composition.

DESCRIPTION OF THE INVENTION

In a first aspect, the invention relates to an enzymatic bleach composition comprising one or more surfactants and an enzyme of extracellular origin, capable of oxidizing substrates by the build-in of one or more oxygen atoms into the substrate using molecular oxygen. The detergent composition may take any suitable physical form, such as a powder, an aqueous or non aqueous liquid, a paste or a gel. Hereafter we describe the various components of the compositions of the invention.

(a) The Surfactant

The compositions of the invention comprise, as a first ingredient, one or more surface active ingredients or surfactants. Depending on the physical type of detergent, the surfactants are present in an amount of 0.1 to 60% by weight of the composition. Typically, an aqueous liquid detergent composition comprises from 5% to 50%, commonly at least 10% and up to 40%, by weight of one or more surface-active compounds. Fabric washing powders usually comprise from 20% to 45% by weight of one or more detergent-active compounds.

The compositions may comprise a single type of surfactant, which may be either a nonionic type or an anionic type of surfactant, but usually they contain a surfactant system consisting of 30–70% by weight (of the system) of one or more anionic surfactants and 70–30% by weight (of the system) of one or more nonionic surfactants. The surfactant system may additionally contain amphoteric or zwitterionic detergent compounds, but this in not normally desired owing to their relatively high cost.

In general, the nonionic and anionic surfactants of the surfactant system may be chosen from the surfactants described "Surface Active Agents" Vol. 1, by Schwartz & Perry, Interscience 1949, Vol. 2 by Schwartz, Perry & Berch, Interscience 1958, in the current edition of "McCutcheon's Emulsifiers and Detergents" published by Manufacturing Confectioners Company or in "Tenside-Taschenbuch", H. Stache, 2nd Edn., Carl Hauser Verlag, 1981.

Suitable nonionic detergent compounds which may be used include, in particular, the reaction products of compounds having a hydrophobic group and a reactive hydrogen atom, for example, aliphatic alcohols, acids, amides or alkyl phenols with alkylene oxides, especially ethylene oxide either alone or with propylene oxide. Specific nonionic detergent compounds are $C_6$–$C_{22}$ alkyl phenolethylene oxide condensates, generally 5 to 25 EO, i.e. 5 to 25 units of ethylene oxide per molecule, and the condensation products of aliphatic $C_8$–$C_{18}$ primary or secondary linear or branched alcohols with ethylene oxide, generally 3 to 40 EO.

Suitable anionic detergent compounds which may be used are usually water-soluble alkali metal salts of organic sulphates and sulphonates having alkyl radicals containing from about 8 to about 22 carbon atoms, the term alkyl being used to include the alkyl portion of higher acyl radicals. Examples of suitable synthetic anionic detergent compounds are sodium and potassium alkyl sulphates, especially those obtained by sulphating higher $C_8$–$C_{18}$ alcohols, produced for example from tallow or coconut oil, sodium and potassium alkyl $C_9$–$C_{20}$ benzene sulphonates, particularly sodium linear secondary alkyl $C_{10}$–$C_{15}$ benzene sulphonates; and sodium alkyl glyceryl ether sulphates, especially those ethers of the higher alcohols derived from tallow or coconut oil and synthetic alcohols derived from petroleum. The preferred anionic detergent compounds are sodium $C_{11}$–$C_{15}$ alkyl benzene sulphonates and sodium $C_{12}$–$C_{18}$ alkyl sulphates.

Also applicable are surfactants such as those described in EP-A-328 177 (Unilever), which show resistance to salting-out, the alkyl polyglycoside surfactants described in EP-A-070 074, and alkyl monoglycosides.

Preferred surfactant systems are mixtures of anionic with nonionic detergent active materials, in particular the groups and examples of anionic and nonionic surfactants pointed out in EP-A-346 995 (Unilever). Especially preferred is surfactant system which is a mixture of an alkali metal salt of a $C_{16}$–$C_{18}$ primary alcohol sulphate together with a mixture of $C_{12}$–$C_{15}$ primary alcohols containing 3 and 7 ethoxylate groups, respectively.

(b) The Enzyme

The enzymatic bleaching composition according to the invention further comprises an enzyme of extracellular origin, capable of oxidising substrates by the build-in of one or more oxygen atoms into the substrate using molecular oxygen. The enzyme may be an oxygenase secreted by microorganisms such as fungi, yeasts or bacteria, and capable of using molecular oxygen provided from air or another source to oxidise chromophores via build-in of one or more oxygen atoms in the chromophoric substrates, thereby decreasing the colour intensity of these chromophores. Preferably, the enzyme is a fungal oxygenase of extracellular origin.

The secreted enzyme may be obtained from fermentation of the micro-organism under any suitable condition, such as fermentation in a rich or minimal cultivation medium, via induction of the micro-organism by certain (chromophoric) organic molecules or building blocks of those molecules, by application of stress conditions during fermentation, or combinations of these.

Suitable enzymes are for example enzymes capable of oxidising chromophores from stains like tea, fruit (in particular red fruit), tomato, curry etc. Without being limited by these examples, one may employ oxygenases capable of degrading chromophores such as those comprising quercetin type of structures (in this invention referred to as "quercetinase"), catechin type of structures (in this invention referred to as "catechinase"), anthocyanin type of structures (in this invention referred to as "anthocyanase"), curcumin, carotenoids and porphyrins or breakdown products thereof.

On the basis of the present application, the man skilled in the art will have no difficulty in finding a suitable oxygenase capable of oxidising the chromophore of his choice by using said chromophore in a screening assay. Such screening assays are well know in the art.

Said oxygenases may be applied in combination with other suitable redox enzymes such as laccases or peroxidases and/or suitable hydrolytic enzymes such as tannases and glycosidases capable of hydrolysing certain bonds in the stain chromophores in order to make the chromophore more accessible to oxidation by the oxygenase. Furthermore, these enzymes may be applied in combination with suitable proteases and lipases to remove any proteinaceous and fatty materials present in stains and possibly hampering the oxidation of the chromophoric molecules. Amylases and cellulases may also be present.

Examples of suitable oxygenases are quercetinases obtainable from *Aspergillus japonicus, Aspergillus flavus, Diaporthe eres, Neurospora crassa, Diplodia gossypin, Penicillium minioluteum, Penicillium roquefortii, Aspergillus awamori, Aspergillus niger, Aspergillus foetidus, Aspergillus soyae* and *Aspergillus oryzae.* In the Canadian Journal of Microbiology Vol 9 (1963), 15–25, F. J. Simpson et al. describe a quercetinase obtainable from *Aspergillus flavus* PRL 1805. Further examples of suitable oxygenases are catechinases obtainable from *Aspergillus japonicus, Neurospora crassa, Diplodia-gossypin, Diaporthe eres* and *Trichoderma reesei.*

The enzymatic bleach compositions of the invention comprise about 0.01 to 100 milligrams, preferably about 0.1 to 10 milligrams, of active enzyme per liter. A detergent composition will comprise about 0.0001% to 1%, preferably from about 0.001 to 0.1% of active enzyme (w/w).

The enzymes used in the present invention can usefully be added to the detergent composition in any suitable form, i.e. the form of a granular composition, a liquid or a slurry of the enzyme, or with carrier material (e.g. as in EP-A-258 068 and the Savinase (TM) and Lipolase (TM) products of Novo Nordisk). A good way of adding the enzyme to a liquid detergent product is in the form of a slurry containing 0.5 to 50% by weight of the enzyme in a ethoxylated alcohol nonionic surfactant, such as described in EP-A-450 702 (Unilever).

(c) Other Ingredients

The enzymatic detergent composition of the present invention may further contain from 5 to 60%, preferably from 20 to 50% by weight of a detergency builder. This detergency builder may be any material capable of reducing the level of free calcium ions in the wash liquor and will preferably provide the composition with other beneficial properties such as the generation of an alkaline pH, the suspension of soil removed from the fabric and the suspension of the fabric-softening clay material.

Examples of detergency builders include precipitating builders such as the alkali metal carbonates, bicarbonates, orthophosphates, sequestering builders such as the alkali metal tripolyphosphates, alkali metal citrates or nitrilotriacetates, or ion exchange builders such as the amorphous alkali metal aluminosilicates or the zeolites.

It was found to be especially favourable for the enzyme activity of the detergent compositions of the present invention if they contained a builder material such that the free calcium concentration is reduced to less than 1 mM.

The enzymatic detergent compositions of present invention may also comprise, in further embodiments, combinations with other enzymes and other constituents normally used in detergent systems, including additives for detergent compositions. Such other components can be any of many known kinds, for example enzyme stabilizers, lather boosters, soil-suspending agents, soil-release polymers, hydrotropes, corrosion inhibitors, dyes, perfumes, silicates, optical brighteners, suds depressants, germicides, antitarnishing agents, opacifiers, fabric softening agents, oxygen-liberating bleaches such as hydrogen peroxide or sodium perborate, or sodium percarbonate, diperisophthalic anhydride, bleach precursors, oxygen-activating bleaches, buffers and the like.

The invention will now be further illustrated in the following, non-limiting Examples.

EXAMPLE 1

Substrate Specificity of the Oxygenases

In this example, the enzyme activity of quercetinase and catechinase on a number of substrates was compared to that of catechol dioxygenase and protocatechuate dioxygenase. The enzyme activity was measured spectrophotometrically at 30° C. in air-saturated 0.1M phosphate buffer pH 6.0 or in air-saturated 0.1M TRIS pH 9.0. The enzyme concentration was in all experiments 20 μg/ml. Concentration of the substrate was 30 μg/ml, except for quercetin where the concentration was 4 μg/ml.

| | Q-ase pH6.0 | Q-ase pH9.0 | C-ase pH6.0 | C-ase pH9.0 | PrD pH6.0 | PrD pH9.0 | CaD pH6.0 | CaD pH9.0 |
|---|---|---|---|---|---|---|---|---|
| quercetin | + | + | + | + | – | – | – | – |
| catechin | – | – | + | + | – | – | – | – |
| pelargonidin | + | – | – | – | – | – | – | – |
| galangin | + | + | + | + | – | – | – | – |
| proto–catechuate | – | – | – | – | + | + | – | – |
| 3-methyl-catechol | – | – | + | + | + | + | + | + |
| 4-methyl-catechol | – | – | + | + | – | – | + | + |

Legend:
+: enzyme active on the substrate
–: enzyme not active on the substrate; no difference with blanco experiment without enzyme.
Q-ase = Quercetinase,
C-ase = Catechinase,
PrD = 3,4 Protocatechuate Dioxygenase,
CaD = 1,2 Catechol dioxy-genase.
Q-ase and C-ase were originally obtained from *Aspergillus japonicus* strain IFO 4408 (Institute for Fermentation, Osaka),
PrD was obtained from Sigma,
CaD was applied as a cell free extract from *Pseudomonas putida*.

The results show that Quercetinase and Catechinase have a much broader substrate specificity and are capable of oxidizing more complex substrates, when compared to intracellular dioxygenase.

EXAMPLE 2

Build-in of Oxygen

Quercetin and pelargonidin (0.12 mg/ml) were incubated with quercetinase (50 mg/l) in Millipored water at 20° C. for 15 minutes, and catechin (3 mg/ml) was incubated with catechinase (14 mg/l) in Millipored water at 20° C. for 30 minutes, in the presence of $^{16}O_2$ and $^{18}O_2$, respectively, and the reaction mixtures were analysed by HPLC coupled to mass spectrometer. By comparing the mass spectra of the reaction products incubated with $^{16}O_2$ and $^{18}O_2$, the increase in the mass of the reaction products and fragments thereof clearly showed that the enzymes are oxygenases. Furthermore, the increase of the mass of the non-fragmented reaction products clearly showed that quercetinase and catechinase are di-oxygenases.

EXAMPLES 3–9

Washing Experiments with Quercetinase in Buffer

Washing experiments were carried out with test cloths in air saturated solutions of 50 mM phoshate buffer pH 6.0 or 50 mM Tris buffer pH 9.0 in micro-titerplates. To each position one stained cotton test cloth was added. The titerplate was placed in a shaking incubator. Experiments were done under the conditions given in the table. The cotton test cloths were stained with pelargonidin (p), Red Fruit (a mixture of coloured substances from various burries) and quercetin (q) respectively.

| Example | Q-ase µg/ml | t (min.) | T (° C.) | pH | q | p | Red Fruit |
|---|---|---|---|---|---|---|---|
| 3 | 70 | 30 | 30 | 6.0 | + | | |
| 4 | 70 | 180 | 30 | 9.0 | + | | |
| 5 | 130 | 60 | 30 | 4.5 | | + | + |
| 6 | 130 | 60 | 30 | 6.0 | | + | + |
| 7 | 130 | 60 | 30 | 7.5 | | + | |
| 8 | 130 | 60 | 30 | 8.0 | | + | |
| 9 | 130 | 60 | 40 | 6.0 | | + | + |

The results clearly show that quercetinase is capable of bleaching stains present on textile, as indicated by a "+" in the Table.

EXAMPLES 10–11

Washing Experiments with Catechinase in Buffer

Examples 3–9 were repeated, except that the cotton test cloths were stained with catechin (c) and Instant Green Tea.

| Example | C-ase µg/ml | t (min.) | T (° C.) | pH | c | IGT |
|---|---|---|---|---|---|---|
| 10 | 140 | 180 | 40 | 9.0 | + | |
| 11 | 140 | 60 | 40 | 6.0 | | + |

The results clearly show that catechinase is capable of bleaching stains on textile, as indicated by a "+" in the Table.

EXAMPLES 12–23

Washing Experiments in a Detergent Formulation

The conditions were the same as for Examples 3–11, except that the washes were performed using a detergent powder (at 1 g/l) of the following composition (in % by weight):

| | |
|---|---|
| Na-PAS | 9 |
| Nonionic 7EO | 12 |
| Nonionic 3EO | 8 |
| Soap | 3 |
| Zeolite A24 (anhydrous) | 56 |
| Carbonate | 2 |
| SCMC | 1 |
| Moisture | 9 |

The results are shown in the table below. These examples clearly show that quercetinase and catechinase are capable of bleaching stains on textile in the presence of a detergent formulation, as indicated by a "+" in the Table.

| example | conc. µg/ml | t (min.) | T (° C.) | pH | c | p | IGT | Red Fruit |
|---|---|---|---|---|---|---|---|---|
| | Q-ase | | | | | | | |
| 12 | 140 | 60 | 40 | 3.0 | | + | | – |
| 13 | 140 | 180 | 40 | 3.0 | | + | | + |
| 14 | 140 | 60 | 40 | 4.5 | | + | | – |
| 15 | 140 | 180 | 40 | 4.5 | | + | | + |
| 16 | 140 | 60 | 40 | 6.0 | | + | | – |
| 17 | 140 | 180 | 40 | 6.0 | | + | | + |
| 18 | 140 | 60 | 40 | 7.5 | | + | | – |
| 19 | 140 | 180 | 40 | 7.5 | | + | | + |
| 20 | 140 | 60 | 30 | 9.4 | | + | | – |
| 21 | 140 | 180 | 30 | 9.4 | | + | | + |
| | C-ase | | | | | | | |
| 22 | 140 | 60 | 40 | 9.0 | – | | + | |
| 23 | 140 | 180 | 40 | 9.0 | + | | + | |

What is claimed is:

1. Process for bleaching stains present on fabrics comprising:

treating the stained fabrics with a composition comprising an effective amount of surfactant for cleaning and an effective amount for bleaching of an enzyme of extracellular origin capable of oxidizing substrates by the build-in of at least one oxygen atom into the fabric using molecular oxygen, the enzyme being a dioxygenase.

2. Enzymatic bleach composition comprising:

(i) from 0.1 to 60% by weight of surfactant; and (ii) an enzyme of extracellular origin, capable of oxidizing substrates by the build-in of at least one oxygen atom into the substrate using molecular oxygen, the enzyme being a dioxygenase.

3. Composition according to claim 2, wherein the dioxygenase is a quercetinase.

4. Composition according to claim 2, wherein the dioxygenase is a catechinase.

5. Composition according to claim 2, wherein the dioxygenase is an anthocyanase.

6. Composition according to claim 2, further comprising a suitable oxidase, peroxidase or hydrolytic enzyme.

7. The composition according to claim 2 wherein molecular oxygen is the sole source of bleaching oxygen.

8. The composition according to claim 2 wherein the molecular oxygen is sourced from air.

* * * * *